United States Patent
Boctor et al.

(10) Patent No.: US 7,669,200 B2
(45) Date of Patent: Feb. 23, 2010

(54) RESIZING AN INSTALL IMAGE

(75) Inventors: Emad Boctor, Toronto (CA); Andrew William Hilden, Oshawa (CA); Karen Jane Pihowich, Thornhill (CA); Igal Ziskind, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 739 days.

(21) Appl. No.: 10/932,734

(22) Filed: Sep. 2, 2004

(65) Prior Publication Data

US 2006/0048138 A1 Mar. 2, 2006

(51) Int. Cl.
G06F 9/44 (2006.01)
G06F 9/445 (2006.01)

(52) U.S. Cl. .................. 717/175; 717/120; 717/167; 717/174

(58) Field of Classification Search .......... 717/105, 717/120, 174
See application file for complete search history.

(56) References Cited

U.S. PATENT DOCUMENTS

| | | | |
|---|---|---|---|
| 5,499,357 A | 3/1996 | Sonty et al. ............ 395/500 |
| 5,930,514 A | 7/1999 | Thompson et al. ........ 395/712 |
| 6,237,144 B1 | 5/2001 | Delo ...................... 717/11 |
| 6,301,708 B1 | 10/2001 | Gazdik et al. ............ 717/11 |
| 6,442,684 B1 | 8/2002 | Lee et al. ................. 713/1 |
| 6,442,754 B1 | 8/2002 | Curtis ................... 717/175 |
| 6,539,476 B1 * | 3/2003 | Marianetti et al. ....... 713/100 |
| 6,618,857 B1 * | 9/2003 | Zimniewicz et al. ..... 717/175 |
| 6,681,391 B1 * | 1/2004 | Marino et al. ........... 717/175 |
| 6,687,902 B1 | 2/2004 | Curtis et al. ............ 717/175 |
| 6,822,753 B1 * | 11/2004 | Momose ................. 358/1.13 |
| 2001/0029607 A1 * | 10/2001 | Veres et al. .............. 717/11 |
| 2004/0221267 A1 * | 11/2004 | Chase et al. ............ 717/121 |

* cited by examiner

*Primary Examiner*—Tuan Q Dam
*Assistant Examiner*—Isaac T Tecklu
(74) *Attorney, Agent, or Firm*—Janaki K. Davda; Konrad Raynes & Victor LLP

(57) ABSTRACT

A data processing system, a data processing implemented system, and an article of manufacture for resizing an image. A removable features list is generated, and the generated removable features list identifies one or more removable features associated with the install image. A removable components list is generated, and the generated removable components list identifies one or more components associated with the one or more removable features. The generated removable features list and the generated removable components list are used to determine which files may be removed from the install image so that removal of one or more components does not impact features that are not to be removed.

30 Claims, 8 Drawing Sheets

RESIZING AN INSTALL IMAGE

FIELD OF THE PRESENT INVENTION

The present invention relates to installation of computer programs, and more specifically, the present invention relates to a method, a data processing system and a computer program product for resizing an install image.

BACKGROUND

An install image may be described as an image of a computer program or computer program product that may be installed. For example, a Microsoft® Word computer program may have an associated install image. To use the computer program, a user installs the install image onto a computer system.

Install images are designed to give a user the ability to select features to be installed. For example, an install image may include information in different languages, and the user may want to install the computer program with one language. A user is able to select features during the execution of an install program that installs the install image.

To give flexibility to users, install images include a maximum number of features. This often leads to large install images, which is a disadvantage to many users. For example, Independent Software Vendors (ISVs) have application programs that embed the install image, and the ISVs often know which features they need and prefer an install image that is as small in size as possible. For example, an install image may include files for both Feature A and Feature B. If an ISV desires to only include Feature A files, the ISV has to locate the files that are used for Feature B and delete these. However, some files may be shared by both Feature A and Feature B, so the ISV has to be very careful not to delete files needed by Feature A that are also used by Feature B.

Thus, only someone with an intimate knowledge of a computer program is able to potentially investigate which portions of the install image (e.g., which cabinet files) for that computer program belong to which feature, and if the feature is not needed, delete that portion and somehow make the unwanted feature unavailable for installation. This is a very time consuming and error-prone process.

Another problem is that, potentially, other features in the install image may require one or more of the removed features, and so problems may arise in the installation and use of the computer program. Thus, image integrity is not preserved with this human process for reducing an install image size.

Therefore, there is a continued need in the art to reduce the size of install images.

SUMMARY

Provided are a method, an article of manufacture (a computer program product), and a data processing system for resizing an image. A removable features list is generated, and the generated removable features list identifying one or more removable features associated with the install image. A removable components list is generated, and the generated removable components list identifies one or more components associated with the one or more removable features. The generated removable features list and the generated removable components list are used to determine which files may be removed from the install image so that removal of one or more components does not impact features that are not to be removed.

BRIEF DESCRIPTION OF THE DRAWINGS

Referring now to the drawings in which like reference numbers represent corresponding parts throughout.

DETAILED DESCRIPTION OF THE IMPLEMENTATIONS

In the following description, reference is made to the accompanying drawings that form a part hereof and which illustrate several implementations of the invention. It is understood that other implementations may be utilized and structural and operational changes may be made without departing from the scope of the invention.

Figure 1:
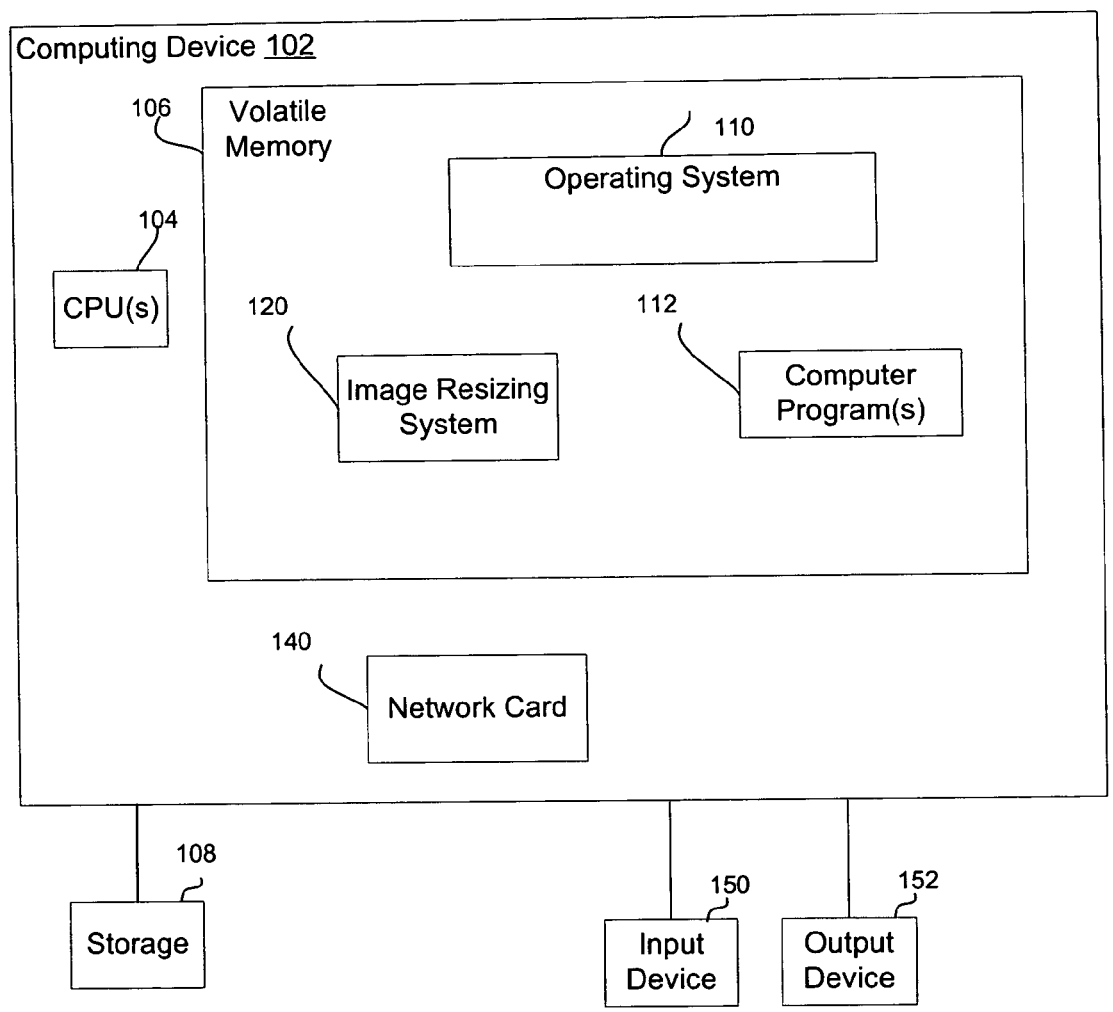
FIG. 1 illustrates details of a computing device in which certain implementations of the invention may be implemented.

FIG. 1 illustrates details of a computing device 102 in which certain implementations of the invention may be implemented. A computing device 102 includes one or more central processing units (CPUs) 104, a volatile memory 106, non-volatile storage 108 (e.g., magnetic disk drives, optical disk drives, a tape drive, etc.), and other components (not shown). Volatile memory 106 stores an operating system 110, one or more computer programs 112, and an image resizing system 120. The image resizing system 120 may be used to reduce the size of any image that has features that may be pruned. For example, the image resizing system 120 may be used to reduce the size of an install image.

The computing device 102 may comprise any computing device known in the art, such as a data processing system, mainframe, server, personal computer, workstation, laptop, handheld computer, telephony device, network appliance, virtualization device, storage controller, etc. Any CPU 104 and operating system 110 known in the art may be used. Programs and data in volatile memory 106 may be swapped into storage 108 as part of memory management operations.

The storage 108 may comprise an internal storage device or an attached or network accessible storage. Programs in the storage 108 may be loaded into the volatile memory 106 and executed by the CPU 104. An input device 150 is used to provide user input to the CPU 104, and may include a keyboard, mouse, pen-stylus, microphone, touch sensitive display screen, or any other activation or input mechanism known in the art. An output device 152 is capable of rendering information transferred from the CPU 104, or other component, such as a display monitor, printer, storage, etc. The computing device 102 further includes a network card 140 to enable communication with a network. Various structures and/or buffers (not shown) may reside in volatile memory 106 or may be located in a storage unit separate from the volatile memory 106 in certain implementations. The computing device 102 of the computer systems may include fewer components than illustrated, additional components not illustrated herein, or some combination of the components illustrated and additional components.

Figure 2:
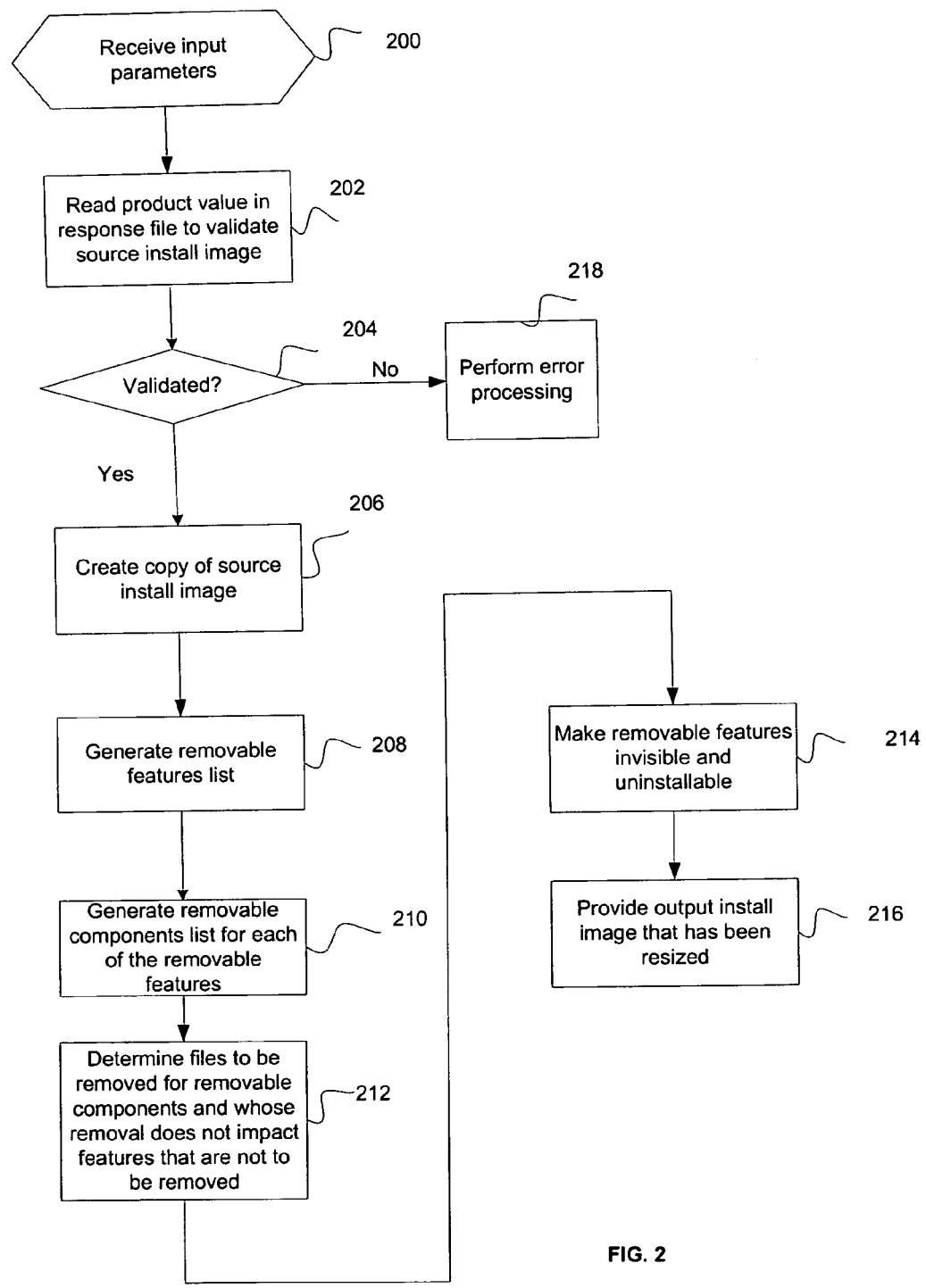
FIG. 2 illustrates generation of an output install image that has been resized in accordance with certain implementations of the invention.

FIG. 2 illustrates generation of an output install image that has been resized in accordance with certain implementations of the invention. Control begins at block 200 with the image resizing system 120 receiving input parameters. The image resizing system 120 receives three parameters: a location of a response file (e.g., a file path to the response file), a location of a source install image (e.g., a file path to a root of the source install image), and a location in which to store an output install image that has been resized (e.g., a file path to a directory in which a output install image is to be stored). A file path may be described as an indication of a file or folder in a directory of a file system. The location of the source install image may be a directory containing a setup.exe file (e.g., an install program that executes to copy the source install image from, for example, a CD-ROM to computing device 102 and that configures the computing device 102 so that the install image may be properly installed) and may be the root of a storage media (e.g., floppy disk or CD-ROM) on which the source install image is located.

The response file may be described as a text file containing one or more name-value pairs. The names may be one of three valid keywords: PROD, COMP or LANG. The PROD keyword identifies the install image to be pruned and is used to verify that the correct response file is being used with the identified install image. The COMP keyword describes a component feature. Certain indicators in the response file indicate whether the component feature for the COMP keyword is to be removed. If a component feature associated with a COMP keyword is to be removed from the install image, then cabinet files containing files for this feature are deleted. A cabinet file may be described as a file that contains one or more other files. The LANG keyword describes a language feature. Certain indicators in the response file indicate whether a particular language feature is to be removed from the install image. In certain implementations, the indicators that indicate whether a component or language feature is to be removed may be, for example, removal of comment indicators in the response file.

Several COMP or LANG keywords may be used in the same response file (e.g., one keyword per line) to remove several features or languages from the source install image.

For example, the following is a sample response file for a database product:

```
* Sample response file for use with an iprune.exe utility
* ----------------------------------------------------
*
* Comments are made by placing either a comment indicator (e.g., * or
a #) * at the start
of a line, or by placing a comment indicator (e.g., ** or ##)
* after the start of a line to * comment out the rest of that line.
*
* To remove the .cab files for a component feature, the comment
indicator
* before for the equivalent COMP keyword is removed.
* To remove the .cab files for a language feature, as well as the
doc files in
* the image * for this language, the comment indicator for the
equivalent
* LANG keyword is removed.
* The PROD keyword is used to identify the product and does not
change.
* ====================================================
```

```
PROD       = RUNTIME_CLIENT
*LANG      = AR
*LANG      = BG
*LANG      = BR
*LANG      = CN
*LANG      = CZ
*LANG      = DE
*LANG      = DK
*LANG      = FI
*LANG      = FR
*LANG      = EL
*LANG      = ES
*LANG      = HR
*LANG      = HU
*LANG      = IW
*LANG      = IT
LANG       = JP
*LANG      = KR
*LANG      = NL
*LANG      = NO
*LANG      = PL
*LANG      = PT
*LANG      = RO
*LANG      = RU
*LANG      = SE
*LANG      = SL
*LANG      = SK
*LANG      = TR
LANG       = TW
*COMP      = SYSTEM_BIND_FILES
              * System bind files that control database functions,
              * such as query optimization
*COMP      = MDAC
              * Microsoft ® Data Access Components (MDAC)
*COMP      = ODBC_SUPPORT
              * Open DataBase Connectivity (ODBC) support
*COMP      = OLE_DB_SUPPORT
              * Object Linking and Embedding (OLE) driver
*COMP      = JDBC_SUPPORT
              * Java ® DataBase Connectivity (JDBC) support
*COMP      = SQLJ_SUPPORT
              *SQL embedded in Java ® support
COMP       = LDAP_EXPLOITATION
              * Light Directory Access Program (LDAP) exploitation
*COMP      = CLIENT_TOOLS
              * Tools used by a client
*COMP      = TCPIP_CLIENT_SUPPORT
              * Transmission Control Protocol/Internet Protocol (TCP/IP)
              * client support to connect to a database
COMP       = NETBIOS_CLIENT_SUPPORT
              * Network Basic Input Output System (NetBIOS)
              * client support to connect to a database
*COMP      = NPIPE_CLIENT_SUPPORT
              *Named pipe client support
*COMP      = APPC_CLIENT_SUPPORT
              * Advanced Program to Program Communications (APPC)
* client support
*COMP      = COMMAND_CENTER
              * Graphical User Interface tool to run commands
```

In the above sample response file, the comment indicators for the Japanese (JP) and Taiwanese (TW) language features have been removed. Therefore, when the image resizing system processes the sample response file, the output install image will not include files for the Japanese and Taiwanese languages. Also, in the above sample response file, the comment indicators for the LDAP_EXPLOITATION and NETBIOS_CLIENT_SUPPORT component features have been removed. When the image resizing system processes the sample response file, the output install image will not include files for the LDAP_EXPLOITATION and NETBIOS_CLIENT_SUPPORT component features.

The location of the output install image may be a path to a directory that the current user has write access to, and the new output install image is copied to this directory. For example, when the image resizing system 120 is a command line utility, the utility may be executed as follows:

iprune.exe-r c:\rtcl.prn-p e:\-o e:\compact_rtcl

In block 202, the image resizing system 120 reads the product value (e.g., the value of the PROD keyword) to validate that a correct source install image for the product specified in the response file exists in the location to the source install image passed to the image resizing system 120. In block 204, if the source install image is validated for the product, then processing continues to block 206, otherwise, processing continues to block 218.

In block 206, the image resizing system 120 creates a copy of the source install image. This copy is modified by the image resizing system 120 and results in the output install image. The image resizing system 120 does not modify the original install image, so a user may revert to using the original install image or may create a new output install image based on the original install image.

In block 208, the image resizing system 120 generates a removable features list for the language and component features that are to be removed when generating the output install image (e.g., the features associated with the LANG and COMP keywords whose comment indicators have been removed in the response file). Further details of generating the removable features list are described with reference to FIG. 3.

In block 210, the image resizing system 120 generates a removable components list for each of the removable features. The removable components list describes components for both component features and language features that are to be removed when generating the output install image. Further details of generating the removable components list are described with reference to FIG. 4.

In block 212, the image resizing system 120 determines files to be removed that are associated with the removable components and whose removal does not impact features that are not to be removed. Further details of determining these files are described with reference to FIG. 6. In block 214, the image resizing system 120 makes the removable features invisible and uninstallable. Thus, these features are "pruned" from the output install image. Further details of making the removable features invisible and uninstallable are described with reference to FIG. 7. In block 216, the image resizing system 120 provides an output install image that has been resized based on removing features from the source install image.

Figure 3:
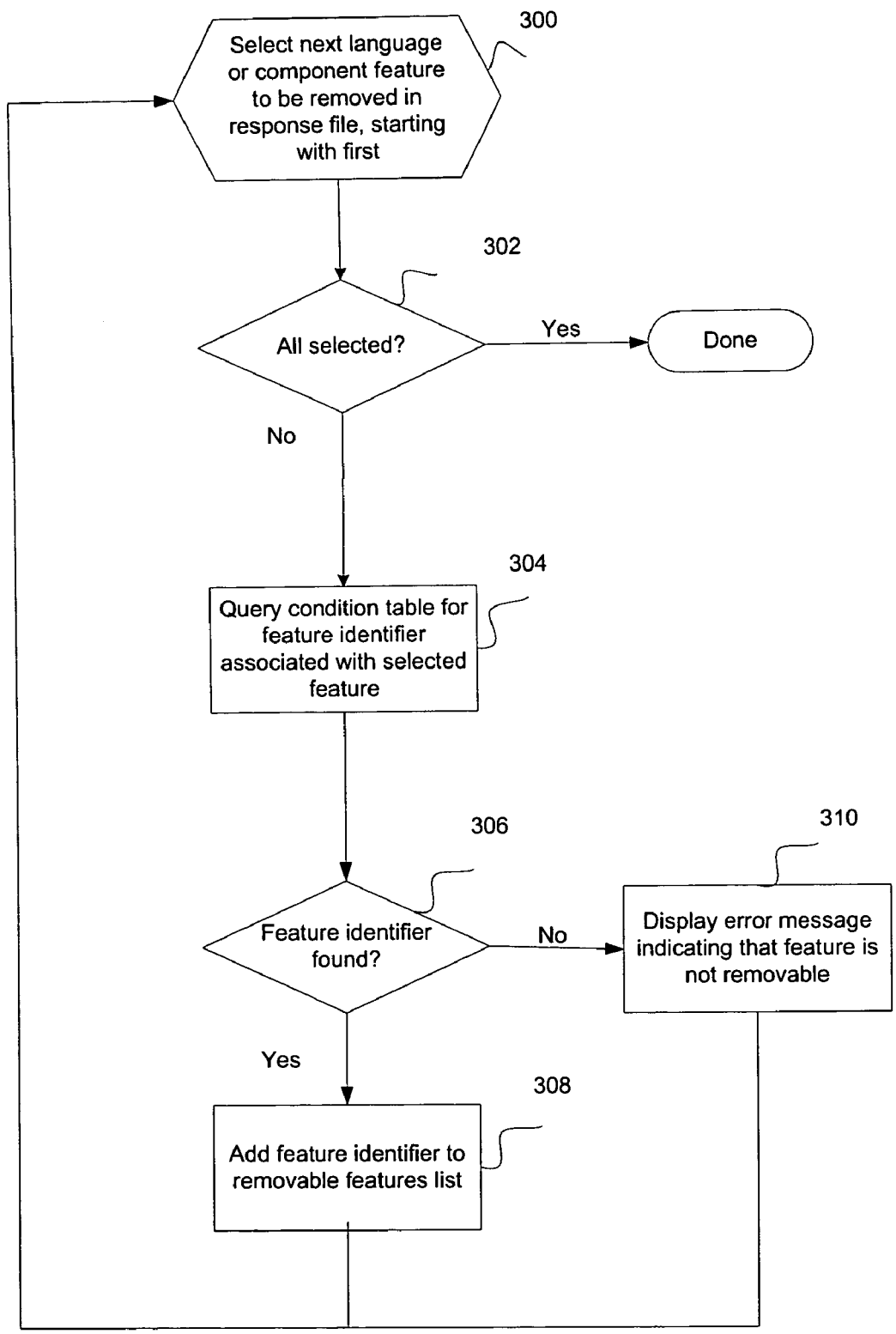
FIG. 3 illustrates generation of a removable features list in accordance with certain implementations of the invention.

FIG. 3 illustrates generation of a removable features list in accordance with certain implementations of the invention. Control begins at block 300 with the image resizing system 120 selecting a next language or component feature to be removed in the response file, starting with the first feature. For example, in the sample response file, the next LANG or COMP keyword whose comment indicator has been removed would be selected.

In block 302, the image resizing system 120 determines whether all language and component features to be removed have been selected from the response file. If so, processing is done, otherwise, processing continues to block 304. In block 304, the image resizing system 120 queries a condition table for a feature identifier (e.g., a feature name) associated with the selected keyword. In certain implementations, the image resizing system 120 uses the value of a selected LANG or COMP keyword to look up a feature to be removed. In block 306, the image resizing system 120 determines whether the feature identifier was found. If so, processing continues to block 308, otherwise, processing continues to block 310. In block 308, the image resizing system 120 adds the feature identifier to a removable features list. In block 310, the image resizing system 120 displays an error message indicating that the selected feature is not removable. From blocks 308 and 310, processing loops back to block 300. In this manner, the image resizing system 120 generates a collection of features that are to be removed. In particular, the image resizing system 120 also verifies that the selected feature is selectable by validating that the selected feature does exist in the condition table. Features that may be selected for removal exist in the condition table, and features that may not be selected for removal are not included in the condition table.

Table A illustrates a sample condition table in accordance with certain implementations of the invention. The condition table includes columns for a feature identifier, a level, and a condition. The level may be described as an integer that controls whether the feature is to be installed or not. For example, in certain implementations, if the level is set to zero, then the feature is invisible and uninstallable, and if the level is set to a value greater than zero, then the feature is visible and installable. The condition may be described as a conditional expression, and if the conditional expression results in a value of TRUE, then the feature will have the level associated with the condition. If the conditional expression results in a value of FALSE, then the feature will not have the level associated with the condition. In this manner, it is possible to have one feature with different levels and different conditions in the same condition table. For example, for the Japanese Language, the condition is: SetupType="Custom". Therefore, when the SetupType value is "Custom", the condition evaluates to TRUE, the level is 100, and the Japanese language feature is installed, and if the SetupType value is "Compact" or "Typical", then the condition evaluates to FALSE and the Japanese language feature is not installed. For other features, the term "<condition>" is used in Table A to indicate that any condition may be specified.

TABLE A

| Feature Identifier | Level | Condition |
|---|---|---|
| Japanese Language | 100 | SetupType = "Custom" |
| Taiwanese Language | 100 | <condition> |
| LDAP | 100 | <condition> |
| NETBIOS | 100 | <condition> |
| . | . | . |
| . | . | . |
| . | . | . |

Figure 4:
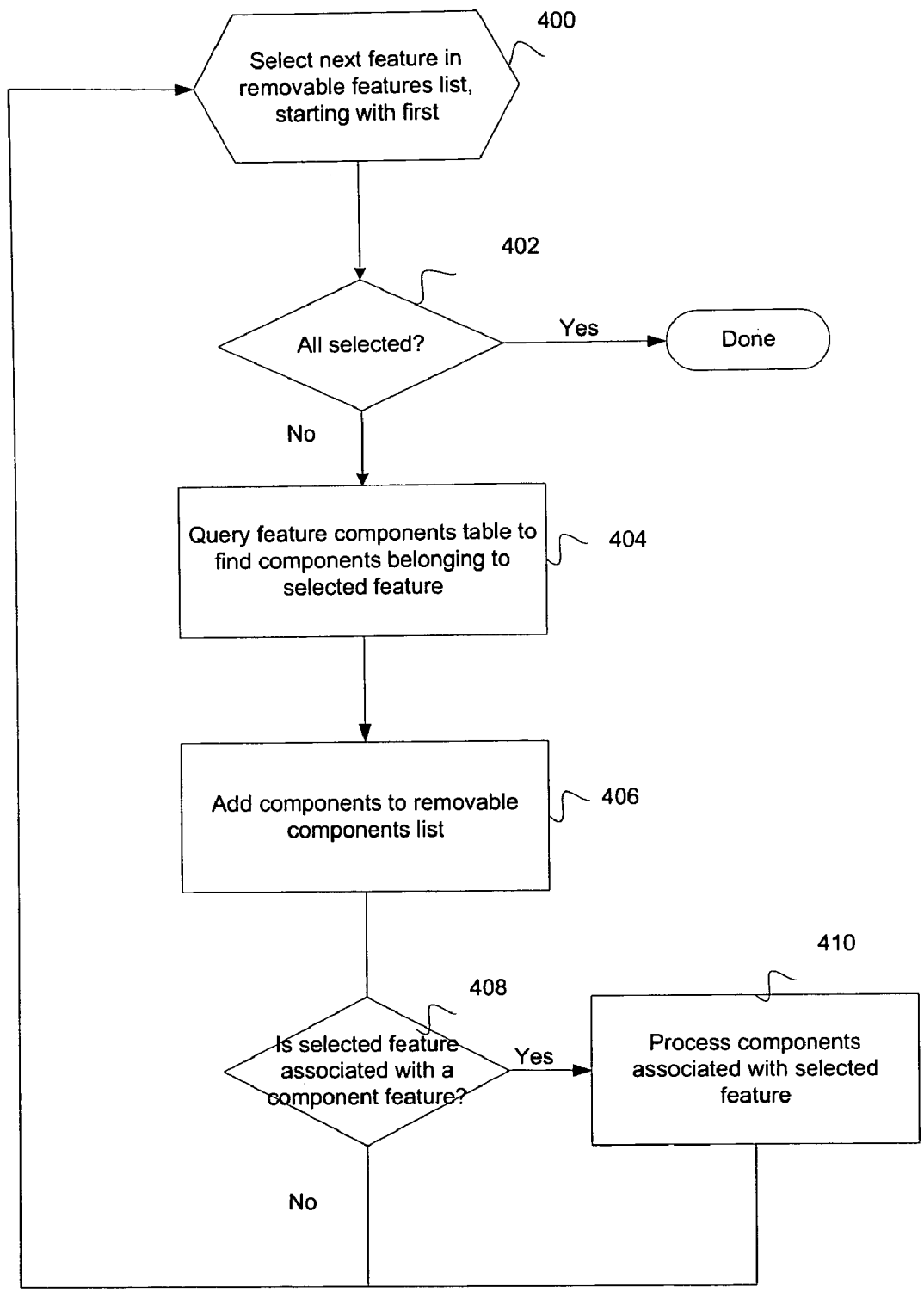
FIG. 4 illustrates generation of a removable components list in accordance with certain implementations of the invention.

FIG. 4 illustrates generation of a removable components list in accordance with certain implementations of the invention. Control begins at block 400 with the image resizing system 120 selecting the next feature in the removable features list, starting with the first. In block 402, the image resizing system determines whether all features have been selected. If so, processing is done, otherwise, processing continues to block 404. In block 404, the image resizing system 120 queries a feature components table to determine which components belong to the selected feature.

Table B illustrates a sample feature components table in accordance with certain implementations of the invention. The feature components table includes columns for feature identifiers and components. The feature components table associates features with the components that belong to the features.

TABLE B

| Feature Identifier | Component |
| --- | --- |
| Japanese Language | Component 1 |
| Japanese Language | Component 2 |
| Taiwanese Language | Component 2 |
| . | . |
| . | . |
| . | . |

In block 406, the image resizing system 120 adds any components for the selected feature to the removable components list. In block 408, the image resizing system 120 determines whether the selected feature is associated with a component feature in the response file (e.g., a COMP keyword). If so, processing continues to block 410, otherwise, processing loops back to block 400. In block 410, the image resizing system 120 further processes the components associated with selected feature. Further details of processing these components are described with reference to FIGS. 5A and 5B. From block 410, processing loops back to block 400.

Figure 5A:
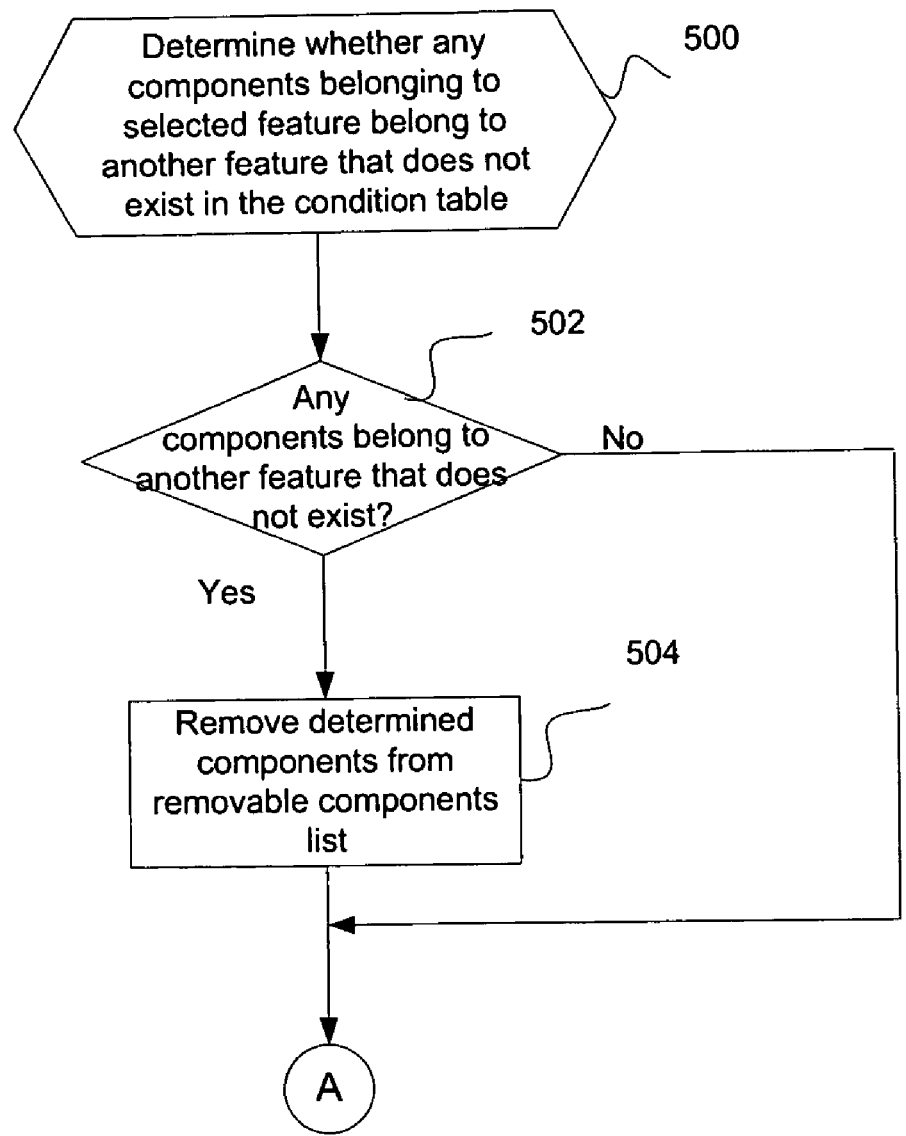
FIGS. 5A and 5B illustrate further processing of components in a removable components list in accordance with certain implementations of the invention.
Figure 5B:
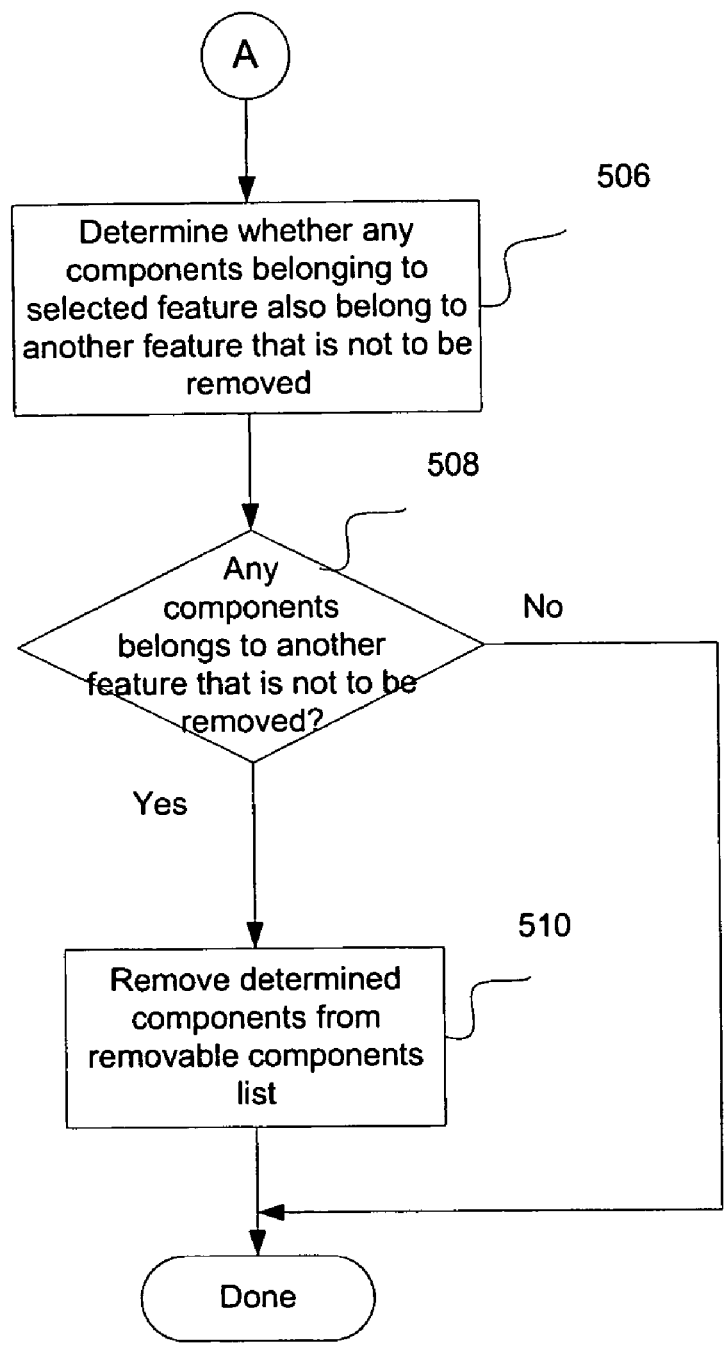

FIGS. 5A and 5B illustrate further processing of components in the removable components list in accordance with certain implementations of the invention. Control begins at block 500 with the image resizing system 120 determining whether any of the components belonging to the selected feature belong to another feature that does not exist in the condition table. In block 502, if any components belong to another feature that does not exist in the condition table, processing continues to block 504, otherwise, processing continues to block 506 (FIG. 5B). In block 504, the image resizing system 120 removes the determined components from the removable components list. From block 504, processing continues to block 506 (FIG. 5B).

In block 506, the image resizing system 120 determines whether any of the components belonging to the selected feature also belong to another feature that is not to be removed. In particular, the image resizing system 120 verifies that any feature that each of the components belongs to is already in the removable features list. In certain implementations in which the components of language features are not shared with other features, this verification is not performed for language features. In block 508, if any of the components belong to feature that is not to be removed, processing continues to block 510, otherwise, processing is done and control returns to block 410 (FIG. 4) and from there processing loops back to block 400. In block 510, the image resizing system 120 removes the determined components from the removable components list. From block 510, processing is done and control returns to block 410 (FIG. 4) and from there processing loops back to block 400.

Figure 6:
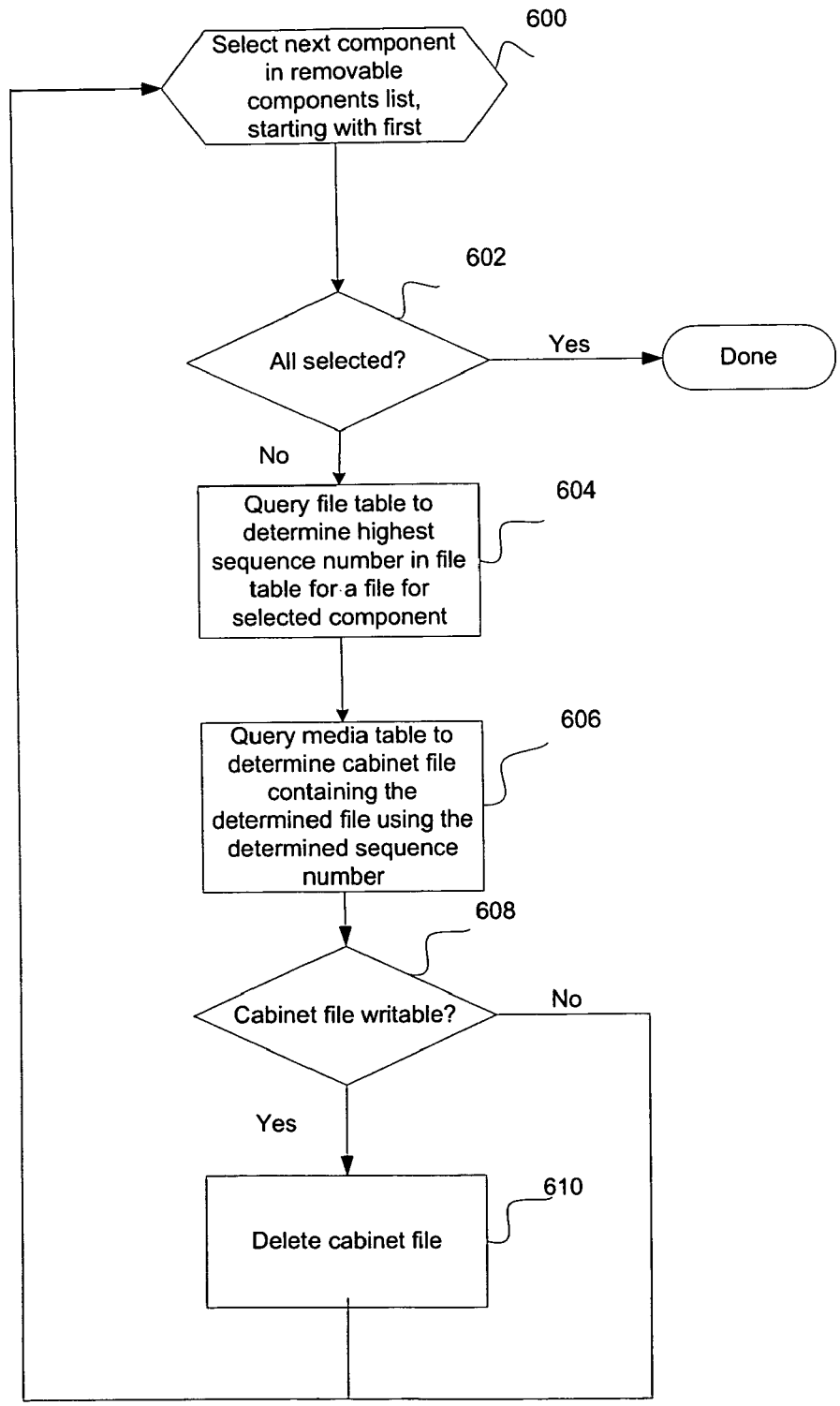
FIG. 6 illustrates a determination of files to be removed in accordance with certain implementations of the invention.

FIG. 6 illustrates determination of files to be removed in accordance with certain implementations of the invention. Control begins at block 600 with the image resizing system 120 selecting the next component in the removable components list, starting with the first. In block 602, the image resizing system 120 determines whether all components have been selected. If so, processing is done, otherwise, processing continues to block 604. In block 604, the image resizing system 120 queries a file table to determine a highest sequence number in the file table for a file for the selected component. In particular, each component may have more than one associated files, and each file has an associated sequence number.

Table C illustrates a sample file table in accordance with certain implementations of the invention. The file table includes columns for file identifiers, components, and sequence numbers. The file table may also include other columns, represented by the last column with ellipses. Each component may include one or more files, and each file has an associated sequence number. The sequence number is used to identify one or more cabinet files containing the associated file.

TABLE C

| File Identifier | Component | Sequence Number | . . . |
| --- | --- | --- | --- |
| File A | NETBIOS | 50 | . . . |
| File B | NETBIOS | 8 | . . . |
| . | . | . | . |
| . | . | . | . |
| . | . | . | . |

In block 606, the image resizing system 120 queries a media table to determine a cabinet file containing the determined file using the determined sequence number. In particular, using the determined sequence number, the image resizing system 120 looks into the media table to determine the cabinet file containing the files for that component.

Table D illustrates a sample media table in accordance with certain implementations of the invention. The media table includes columns for sequence numbers and cabinet file identifiers. The media table may also include other columns, represented by the last column with ellipses.

TABLE D

| Sequence Number | Cabinet File Identifier | . . . |
| --- | --- | --- |
| 50 | Cab File W | . . . |
| . | . | . |
| . | . | . |
| . | . | . |

In block 608, the image resizing system 120 determines whether the determined cabinet file is writable. If so, processing continues to block 610, otherwise, processing loops back to block 600. In block 610, the image resizing system deletes the cabinet file.

Figure 7:
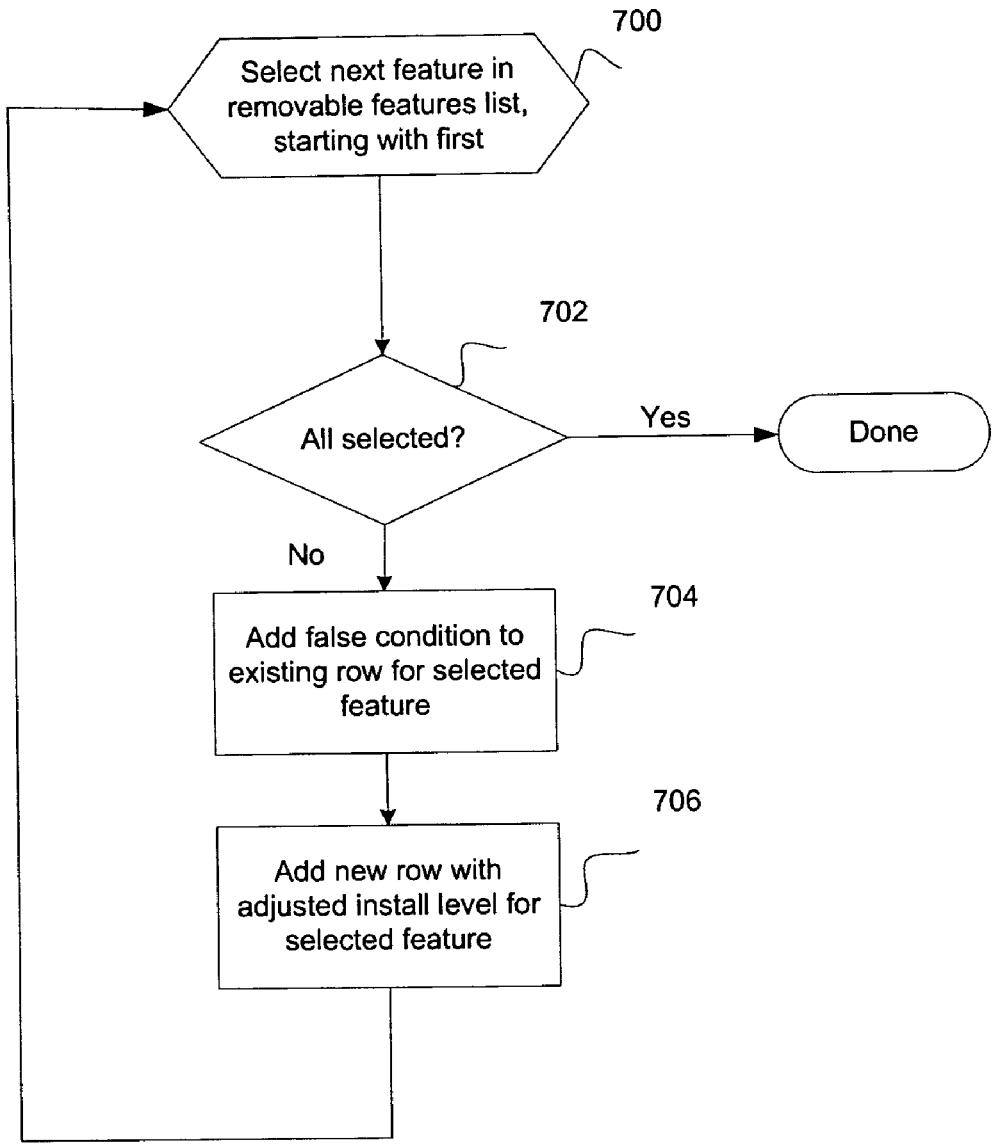
FIG. 7 illustrates making removable features invisible and uninstallable in accordance with certain implementations of the invention.

FIG. 7 illustrates making the removable features invisible and uninstallable in accordance with certain implementations of the invention. A feature may be described as invisible if the feature cannot be detected by a user. A feature may be described as uninstallable if the feature cannot be installed from an install image. Control begins at block 700 with the image resizing system 120 selecting the next feature in the removable features list, starting with the first. In block 702, the image resizing system 120 determines whether all features have been selected. If so, processing is done, otherwise, processing continues to block 702. In block 704, the image resizing system 120 adds a false condition to an existing row in the condition table. That is, the image resizing system 120 modifies the existing condition so that the conditional expression evaluates to FALSE. This makes the feature uninstallable. In block 706, the image resizing system adds a new row with an adjusted install level for the selected feature in the condition table. In certain implantations, the level is set to zero so that the feature is invisible. In certain implementations, a new row with an adjusted level is not modified for language features because they are already invisible. Adjusting the level and adding the false condition makes a feature uninstallable. From block 706, processing loops back to block 700. Thus, the image resizing system ensures that a feature that has been pruned is invisible to the user and is not installable. It then invalidates any existing install level in the condition table for this feature by making its condition false thereby making the feature uninstallable.

Revised table A illustrates a sample condition table that has been modified by the image resizing system 120 in accordance with certain implementations of the invention. For example, for each feature that is to be removed (e.g., the Japanese and Taiwanese language features in this example with reference to revised Table A), a new row is added in which the level has been changed from 100 in Table A to 0 in revised Table A and the condition column value has been set to TRUE so that the feature will not be installed. Also, for each existing row of Table A, in revised Table A, the condition has been modified by adding "AND FALSE" to the condition, so that the condition evaluates to FALSE and the feature will not be installed.

REVISED TABLE A

| Feature Identifier | Level | Condition |
| --- | --- | --- |
| Japanese Language | 100 | SetupType = "Custom" AND FALSE |
| Taiwanese Language | 100 | <condition> AND FALSE |
| LDAP | 100 | <condition> |
| NETBIOS | 100 | <condition> |
| Japanese Language | 0 | TRUE |
| Taiwanese Language | 0 | TRUE |
| LDAP | 0 | <condition> |
| NETBIOS | 0 | <condition> |
| . | . | . |
| . | . | . |
| . | . | . |

Thus, in certain implementations, the image resizing system 120 a command line tool (e.g., called iprune.exe) that is used to make some features in an install image (e.g., a Windows® operating system installer-based image) invisible to the end user and unavailable for installation. In certain implementations, the iprune.exe command line tool is a utility.

The image resizing system 120 also calculates which files (e.g., cabinet files) contain files to be installed for the removed features and deletes these files, thus reducing the install image size. The image resizing system 120 also does not remove a feature if that feature is required by another feature that is not removed. Thus, the image resizing system 120 avoids any errors that may result from removing a component that belongs to a feature not removed or removing a feature that is required by another feature to be installed.

Microsoft and Windows are registered trademarks or common law marks of Microsoft Corporation in the United States and/or other countries. Java is a registered trademark or common law mark of SUN Microsystems, Inc. in the United States and/or other countries.

Additional Implementation Details

The described implementations may be implemented as a method, apparatus or article of manufacture using programming and/or engineering techniques to produce software, firmware, hardware, or any combination thereof. The term "article of manufacture" and "circuitry" as used herein refers to a state machine, code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. When the code or logic is executed by a processor, the circuitry may include the medium including the code or logic as well as the processor that executes the code loaded from the medium. The code in which preferred implementations are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration, and that the article of manufacture may comprise any information bearing medium known in the art. Additionally, the devices, adapters, etc., may be implemented in one or more integrated circuits on the adapter or on the motherboard.

The logic of FIGS. 2-7 describes specific operations occurring in a particular order. In alternative implementations, certain of the logic operations may be performed in a different order, modified or removed. Moreover, operations may be added to the above described logic and still conform to the described implementations. Further, operations described herein may occur sequentially or certain operations may be processed in parallel, or operations described as performed by a single process may be performed by distributed processes.

The illustrated logic of FIGS. 2-7 may be implemented in software, hardware, programmable and non-programmable gate array logic or in some combination of hardware, software, or gate array logic.

The foregoing description of implementations of the invention has been presented for the purposes of illustration and description. It is not intended to be exhaustive or to limit the implementations of the invention to the precise form disclosed. Many modifications and variations are possible in light of the above teaching. It is intended that the scope of the implementations of the invention be limited not by this detailed description, but rather by the claims appended hereto. The above specification, examples and data provide a complete description of the manufacture and use of the composition of the implementations of the invention. Since many implementations of the invention can be made without departing from the spirit and scope of the implementations of the invention, the implementations of the invention reside in the claims hereinafter appended or any subsequently-filed claims, and their equivalents.

What is claimed is:

1. A data processing system implemented method for directing a data processing system to resize an install image, the data processing system having a memory for storing the install image, the install image used to install a computer program product, the data processing system implemented method comprising:

generating a removable features list for language features and component features that are to be removed, the generated removable features list identifying one or more removable features associated with the install image;

generating a removable components list that identifies one or more components that are to be removed and that are associated with each of the one or more removable features in the removable features list for the language features and the component features; and using the generated removable features list and the generated removable components list to determine which files are to be removed from the install image by:

for each feature in the removable features list, determining whether any components belonging to the feature belong to another feature that is not to be removed by determining whether any feature that the components belong to are in the removable features list;

removing any components from the removable components list that are determined to belong to another feature that is not to be removed; and making the removable feature invisible and uninstallable by updating a condition table by:

providing the condition table that includes a level and a condition for each feature, wherein the level controls whether the feature is to be installed or not, wherein the condition is a conditional expression, wherein the feature has the level associated with the condition when the conditional expression results in a value of true, and wherein the feature does not have the level associated with the condition when the conditional expression results in a value of false;

modifying an existing condition in the condition table for the feature so that the conditional expression of the condition evaluates to false; and adding a new row to the condition table for the feature with an adjusted install level that indicates that the feature is not to be and a conditional expression that evaluates to true.

2. The method of claim 1, wherein removable features that are invisible cannot be detected by a user, wherein a removable feature that is uninstallable cannot be installed from an install image, and wherein at least one feature has different levels and different associated conditions in the condition table.

3. The method of claim 1, further comprising:

validating that a source install image corresponds to a product specified in a response file, wherein the response file includes one or more pairs of keywords and values, wherein a keyword indicates whether a particular feature is a language feature or a component feature, wherein an indicator for a pair in the response file indicates whether that feature is to be removed.

4. The method of claim 3, further comprising:

receiving input parameters that specify a location of the response file, a location of the source install image, and a location in which to store an output install image that has been resized.

5. The method of claim 1, further comprising:

creating a copy of the source install image.

6. The method of claim 5, further comprising:

providing an output install image that has been resized.

7. The method of claim 1, wherein generating the removable features list further comprises:

for each keyword in a response file, determining whether a feature associated with the keyword is selectable for removal by:

querying the condition table for a feature identifier associated with the keyword, wherein features that can be selected for removal exist in the condition table;

adding the feature identifier to the removable features list in response to determining that the feature identifier is found; and displaying an error message indicating that the feature is not removable in response to determining that the feature identifier is not found in the condition table.

8. The method of claim 1, wherein generating the removable components list further comprises:

for each feature in the removable features list, querying a feature components table to find components belonging to the selected feature; and adding the found components to the removable components list.

9. The method of claim 8, further comprising:

for each feature associated with a component feature in a response file, determining whether any components belonging to the feature belong to another feature that does not exist in the condition table; and removing any components from the removable components list that are determined to belong to another feature that does not exist in the condition table.

10. The method of claim 1, wherein determining the files to be removed further comprises:

for each component in the removable components list, querying a file table to determine a highest sequence number for a file for the component;

querying a media table using the highest sequence number to determine a cabinet file containing the file; and deleting the cabinet file in response to determining that the cabinet file is writable.

11. An article of manufacture for directing a data processing system to resize an install image, the data processing system having a memory for storing the install image, the install image used to install a computer program product, wherein the article of manufacture comprises a computer readable storage medium storing instructions, wherein the instructions, when executed by a processor of the data processing system are operable to:

generate a removable features list for language features and component features that are to be removed, the generated removable features list identifying one or more removable features associated with the install image;

generate a removable components list that identifies one or more components that are to be removed and that are associated with each of the one or more removable features in the removable features list for the language features and the component features; and use the generated removable features list and the generated removable components list to determine which files are to be removed from the install image by:

for each feature in the removable features list, determining whether any components belonging to the feature belong to another feature that is not to be removed by determining whether any feature that the components belong to are in the removable features list;

removing any components from the removable components list that are determined to belong to another feature that is not to be removed; and making the removable feature invisible and uninstallable by updating a condition table by:

providing the condition table that includes a level and a condition for each feature, wherein the level controls whether the feature is to be installed or not, wherein the condition is a conditional expression, wherein the feature has the level associated with the condition when the conditional expression results in a value of true, and wherein the feature does not have the level associated with the condition when the conditional expression results in a value of false;

modifying an existing condition in the condition table for the feature so that the conditional expression of the condition evaluates to false; and adding a new row to the condition table for the feature with an adjusted install level that indicates that the feature is not to be and a conditional expression that evaluates to true.

12. The article of manufacture of claim 11, wherein removable features that are invisible cannot be detected by a user, wherein a removable feature that is uninstallable cannot be installed from an install image, and wherein at least one feature has different levels and different associated conditions in the condition table.

13. The article of manufacture of claim 11, wherein the instructions, when executed by the processor of the data processing system are operable to:

validate that a source install image corresponds to a product specified in a response file, wherein the response file includes one or more pairs of keywords and values, wherein a keyword indicates whether a particular feature is a language feature or a component feature, wherein an indicator for a pair in the response file indicates whether that feature is to be removed.

14. The article of manufacture of claim 13, wherein the instructions, when executed by the processor of the data processing system are operable to:

receive input parameters that specify a location of the response file, a location of the source install image, and a location in which to store an output install image that has been resized.

15. The article of manufacture of claim 11, wherein the instructions, when executed by the processor of the data processing system are operable to:

create a copy of the source install image.

16. The article of manufacture of claim 15, wherein the instructions, when executed by the processor of the data processing system are operable to:

provide an output install image that has been resized.

17. The article of manufacture of claim 11, wherein to generate the removable features list, the instructions, when executed by the processor of the data processing system are operable to:

for each keyword in a response file, determining whether a feature associated with the keyword is selectable for removal by:

query the condition table for a feature identifier associated with the keyword, wherein features that can be selected for removal exist in the condition table;

add the feature identifier to the removable features list in response to determining that the feature identifier is found; and display an error message indicating that the feature is not removable in response to determining that the feature identifier is not found.

18. The article of manufacture of claim 11, wherein to generate the removable components list, the instructions, when executed by the processor of the data processing system are operable to:

for each feature in the removable features list, query a feature components table to find components belonging to the selected feature; and add the found components to the removable components list.

19. The article of manufacture of claim 18, wherein the instructions, when executed by the processor of the data processing system are operable to:

for each feature associated with a component feature in a response file, determine whether any components belonging to the feature belong to another feature that does not exist in the condition table; and remove any components from the removable components list that are determined to belong to another feature that does not exist in the condition table.

20. The article of manufacture of claim 11, wherein to determine the files to be removed, the instructions, when executed by the processor of the data processing system are operable to:

for each component in the removable components list, query a file table to determine a highest sequence number for a file for the component;

query a media table using the highest sequence number to determine a cabinet file containing the file; and delete the cabinet file in response to determining that the cabinet file is writable.

21. A data processing system for resizing an install image, the data processing system having a memory for storing the install image, the install image used to install a computer program product, comprising:

circuitry implemented in hardware logic and operable to:

generate a removable features list for language features and component features that are to be removed, the generated removable features list identifying one or more removable features associated with the install image;

generate a removable components list that identifies one or more components that are to be removed and that are associated with each of the one or more removable features in the removable features list for the language features and the component features; and use the generated removable features list and the generated removable components list to determine which files are to be removed from the install image by:

for each feature in the removable features list, determining whether any components belonging to the feature belong to another feature that is not to be removed by determining whether any feature that the components belong to are in the removable features list;

removing any components from the removable components list that are determined to belong to another feature that is not to be removed; and making the removable feature invisible and uninstallable by updating a condition table by:

providing the condition table that includes a level and a condition for each feature, wherein the level controls whether the feature is to be installed or not, wherein the condition is a conditional expression, wherein the feature has the level associated with the condition when the conditional expression results in a value of true, and wherein the feature does not have the level associated with the condition when the conditional expression results in a value of false;

modifying an existing condition in the condition table for the feature so that the conditional expression of the condition evaluates to false; and adding a new row to the condition table for the feature with an adjusted install level that indicates that the feature is not to be and a conditional expression that evaluates to true.

22. The system of claim 21, wherein removable features that are invisible cannot be detected by a user, wherein a removable feature that is uninstallable cannot be installed from an install image, and wherein at least one feature has different levels and different associated conditions in the condition table.

23. The system of claim 21, wherein the circuitry is operable to:

validate that a source install image corresponds to a product specified in a response file, wherein the response file includes one or more pairs of keywords and values, wherein a keyword indicates whether a particular feature is a language feature or a component feature, wherein an indicator for a pair in the response file indicates whether that feature is to be removed.

24. The system of claim 23, wherein the circuitry is operable to:

receive input parameters that specify a location of the response file, a location of the source install image, and a location in which to store an output install image that has been resized.

25. The system of claim 21, wherein the circuitry is operable to:

create a copy of the source install image.

26. The system of claim 25, wherein the circuitry is operable to:

provide an output install image that has been resized.

27. The system of claim 21, wherein to generate the removable features list, the circuitry is operable to:

for each keyword in a response file, determining whether a feature associated with the keyword is selectable for removal by:
query the condition table for a feature identifier associated with the keyword, wherein features that can be selected for removal exist in the condition table;
add the feature identifier to the removable features list in response to determining that the feature identifier is found; and
display an error message indicating that the feature is not removable in response to determining that the feature identifier is not found.

28. The system of claim 21, wherein to generate the removable components list, the circuitry is operable to:

for each feature in the removable features list,
query a feature components table to find components belonging to the selected feature; and
add the found components to the removable components list.

29. The system of claim 28, wherein the circuitry is operable to:

for each feature associated with a component feature in a response file,
determine whether any components belonging to the feature belong to another feature that does not exist in the condition table; and
remove any components from the removable components list that are determined to belong to another feature that does not exist in the condition table.

30. The system of claim 21, wherein to determine the files to be removed, the circuitry is operable to:

for each component in the removable components list,
query a file table to determine a highest sequence number for a file for the component;
query a media table using the highest sequence number to determine a cabinet file containing the file; and
delete the cabinet file in response to determining that the cabinet file is writable.

* * * * *